Figure 1:
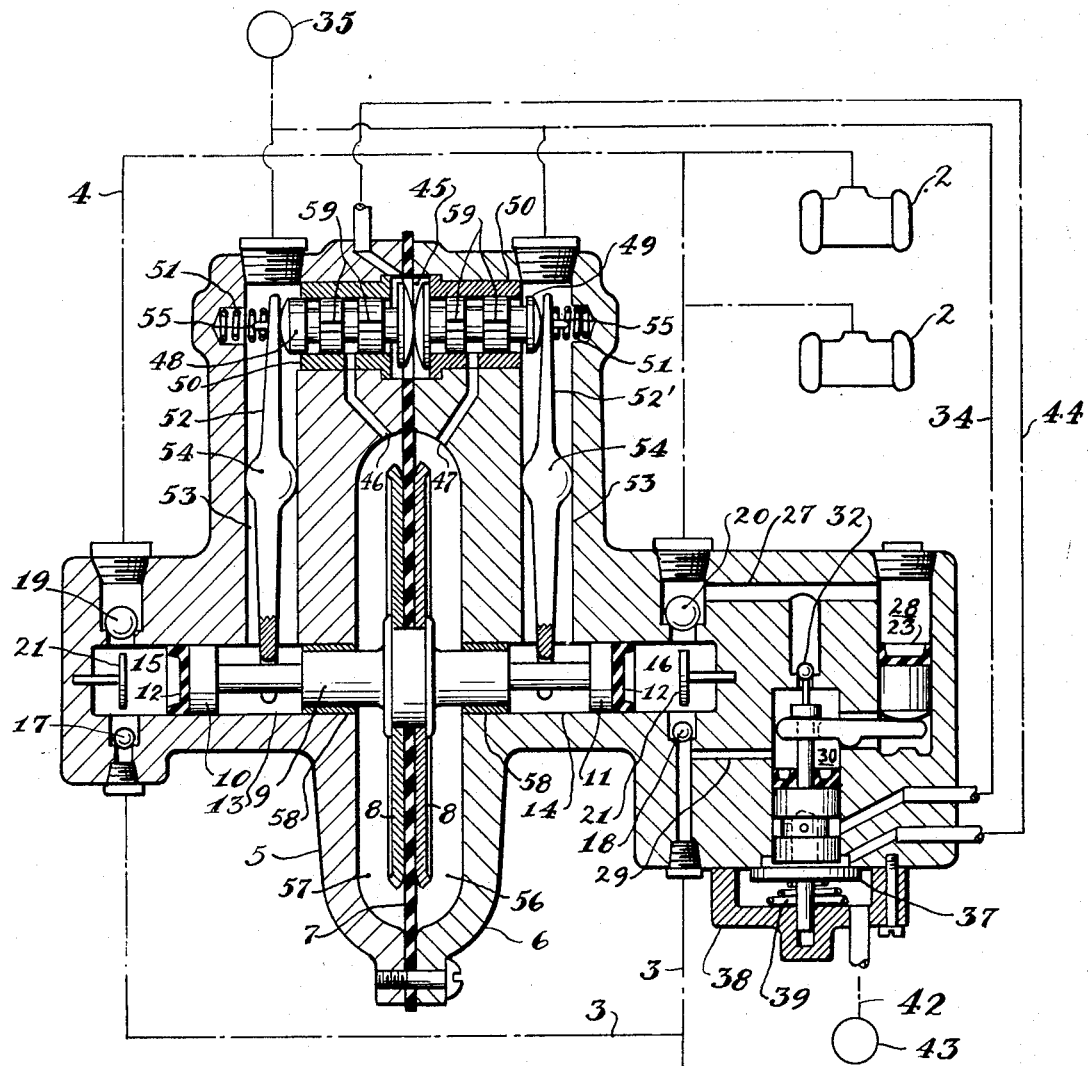

April 9, 1946.  W. STELZER  2,398,165
HYDRAULIC BOOSTER
Filed June 11, 1943  2 Sheets-Sheet 1

INVENTOR.
William Stelzer

Patented Apr. 9, 1946

2,398,165

UNITED STATES PATENT OFFICE 2,398,165

HYDRAULIC BOOSTER

William Stelzer, Detroit, Mich.

Application June 11, 1943, Serial No. 490,430

11 Claims. (Cl. 60—52)

The invention relates to hydraulic boosters and more particularly to a hydraulic pressure booster having reciprocatory elements adapted to boost the pressure of hydraulic fluid and to transmit the latter without limitation of capacity. The invention is particularly suited for use with hydraulic brakes to increase the hydraulic pressure of the wheel cylinders in a predetermined proportion to the hydraulic pressure obtained by manual power from the master cylinder.

Since the hydraulic displacement of different braking systems varies, and is increased considerably after wear of the brake lining, it has been customary to make present-day boosters of sufficient capacity so as to have a certain reserve, for which reason boosters are bulky and consequently expensive.

It is the object of this invention to provide a booster of unlimited capacity not by increasing the size but making the operation reversible, so that at the end of a stroke the booster pistons reverse their functions and start a new stroke in the opposite direction.

Another object is to provide a booster having the same function in either direction.

An important aim of the invention is to provide modulating means to control the power for the operation of the booster so that the boosted hydraulic pressure is in a predetermined proportion to the master cylinder pressure.

Another aim is to provide a relief valve which relieves the hydraulic pressure in the wheel cylinders quickly when the master cylinder is released, to return the fluid to the master cylinder without waiting for the booster to attain the "off" position.

A still further aim is to provide novel and simplified means for modulating the power, making use of the reaction of the master cylinder pressure and the boosted pressure, where the piston that is responsive to the boosted pressure is acted upon on its other side by the lower, or master cylinder pressure. This feature eliminates a possible source of leakage of hydraulic fluid.

Figure 2:
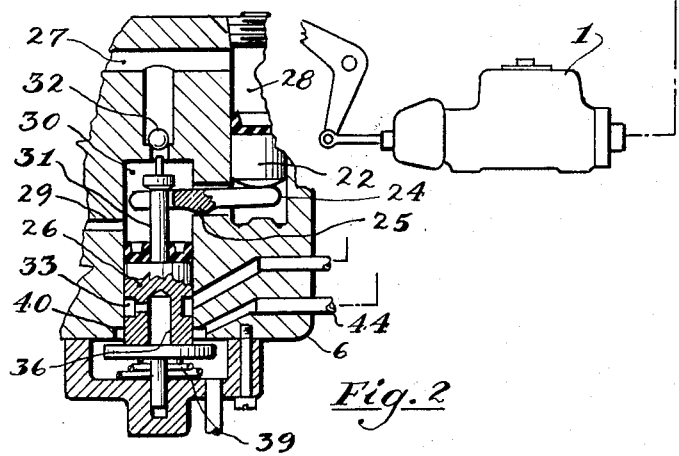
Figure 3:
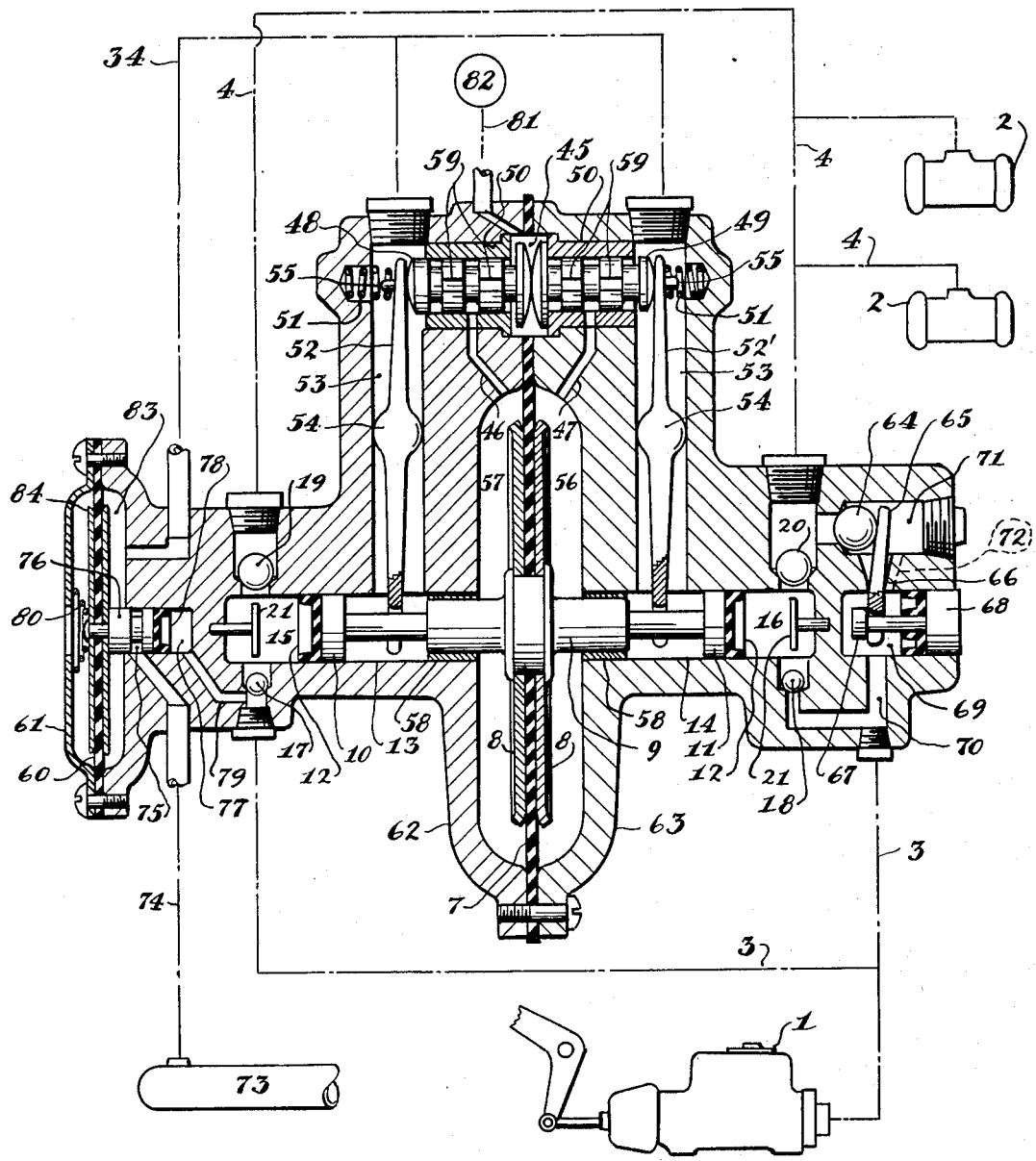

Other objects and advantages of this invention will be apparent from the following detailed description considered in connection with the accompanying drawings submitted for the purpose of illustration and not intended to define the scope of the invention, reference being had for that purpose to the subjoined claims. In the drawings, wherein similar reference characters refer to similar parts:

Fig. 1 is a sectional elevation of the novel booster, connected to a hydraulic braking system which is shown diagrammatically;

Fig. 2, a sectional elevation of the modulating device shown in a position where power is directed to the booster; and Fig. 3, a sectional elevation of a modified form of the novel booster, also connected to a hydraulic braking system shown diagrammatically.

Before explaining the present invention in detail, it is to be understood that the invention is not limited in its application to the details of construction and arrangement of parts illustrated in the accompanying drawings, since the invention is capable of other embodiments and of being carried out or practised in various ways. Also it is to be understood that the phraseology or terminology employed herein is for the purpose of description and not limitation.

Describing the invention now in detail, and referring to Fig. 1, the novel booster unit is shown in combination with a conventional hydraulic braking system comprising a master cylinder 1 operated by the operator and wheel or slave cylinders 2 which operate the brake shoes or other device. The booster is placed intermediate the usual brake line, that leads from the master cylinder 1 to the wheel cylinders 2, whereby the pressure transmitting line leading from the master cylinder to the booster is denoted by numeral 3, and forms the primary or low pressure circuit, and 4 is the pressure transmitting line leading from the booster to a plurality of wheel cylinders, forming the secondary or high pressure circuit.

The booster unit consists of housings 5 and 6 with a diaphragm 7 interposed. The latter is clamped between diaphragm plates 8 secured to a piston rod 9 carrying pistons 10 and 11 provided with seals 12. These pistons slide in axially aligned bores or cylinders 13 and 14 and form cylinder chambers 15 and 16, fluid passage to which from master cylinder 1 is provided by check valves 17 and 18; whereas check valves 19 and 20 allow fluid to pass from chambers 15 and 16, respectively, to the secondary circuit 4, but not vice versa. Guards 21 merely serve as retainers for balls 17 and 18.

To control the booster ratio, i. e., the proportion between the hydraulic pressure of the primary circuit and that of the secondary circuit, a modulating device is provided comprising a slidable piston 22 (Figure 2) with a seal 23 responsive to the hydraulic pressure of the secondary circuit to act on a lever 24 fulcrumed at 25 and opposing a slidable control piston 26 responsive to the low pressure or primary circuit.

Some of the elements are indicated by numerals in Fig. 2 only in order not to encumber the drawings. The pressure of the secondary circuit acts on seal 23 and piston 22 via passage 27 and chamber 28, and the pressure of the primary circuit is communicated not only to piston 26 but also to the underside of piston 22 through passage 29, cylinder chamber 30, and the bore or hole which accommodates lever 24. The latter has a forked end engaging the piston rod 31 whose upper portion is provided with a shoulder for that purpose. A small extension of said piston rod 31 pointing upwardly serves to unseat relief valve 32 when the hydraulic pressure in the secondary circuit is greater than the pre-determined multiple of the hydraulic pressure in the primary circuit. Piston 26 also serves as part of a valve to direct power to and from the booster and for this purpose has a circular groove 33 in communication with the low pressure or suction line 34 connected to a source of low pressure or vacuum 35. The lower end of piston 26 also has a central bore 36 in communication with groove 33. Bore 36 may be closed off by a valve disc 37 guided by its valve stem which slides in cup 38, and urged against the housing by a spring 39 to close off groove 40 from pressure chamber 41 from which a line 42 leads to a source of fluid pressure 43. It is immaterial, as far as the principle of the invention is concerned, whether 43 consists of atmospheric air pressure and 35 of a source of vacuum, or whether 35 is open to atmospheric pressure and 43 is a source of higher fluid pressure, such as is obtained by an air compressor.

Groove 40 is connected with line 44 leading to chamber 45, from where the air pressure is directed alternately through passages 46 and 47 to one side of diaphragm 7 or the other depending on the position of reversing valves 48 and 49, the latter sliding in inserts 50 pressed into housings 5 and 6. Both valves are held against each other by springs 51 through the intermediary of operating levers 52 and 52' disposed in bores 53 and fulcrumed at their spherical central portion 54. The upper ends have extending therefrom small studs or pins 55 which merely serve as a guide for springs 51. It will be noted that bores 53 are open to the low pressure or source of vacuum 35. To seal these against power chambers 56 and 57 seals or bushings 58 are provided. These may be omitted if the piston rod 9 is adapted in size to fit cylinders 13 and 14.

Valves 48 and 49 have circular grooves all of which are permanently in communication with passages 46 and 47, respectively, through longitudinal slots 59.

The modification shown in Fig. 3 is similar to Fig. 1, with the exception that the power directed to chambers 56 or 57 is controlled by a modulating device responsive to the admitted power and the hydraulic pressure of the master cylinder and consisting of a diaphragm 60 held by a cover 61 against housing 62, the other half of the booster housing being indicated by numeral 63 and comprising a relief valve consisting of a ball 64 held on its seat by a lever 65 fulcrumed at 66 in a tapered hole, the lower end being forked to engage shoulder 67 of the piston rod of piston 68 sliding in chamber 69 and subjected to the master cylinder pressure through passage 70. To allow fluid to pass from chamber 71 to chamber 69 hole 66 is made somewhat larger than the diameter of lever 65, or a groove 72 is provided.

As a source of power for the booster preferably vacuum is used, thus 73 illustrates the intake manifold of an internal combustion engine, whereby line 74 leads from it to groove 75 in valve plunger 76 adapted to slide in valve chamber 77 and provided with a seal 78 subjected to the hydraulic pressure of the master cylinder through passage 79. A light spring 80 is provided to urge the valve plunger into chamber 77. Instead of pressure line 44 of Fig. 1, a pressure line 81 leads from chamber 45 to a source of air pressure 82, which may be atmospheric.

Describing now the operation of the booster illustrated in Fig. 1, and assuming that it is in a position as shown, depression of the foot pedal by the operator to actuate master cylinder 1 produces a hydraulic pressure in line 3 which is communicated to line 4 to apply the wheel cylinders 2 and thereby actuate the brakes. The pressure is transmitted through check valves 17, 18, 19 and 20, these being arranged to let fluid pass from the primary circuit to the secondary circuit, but not vice versa. The pressure is also communicated to chambers 28 and 30, of the modulating valve. Because the pressure acts on both sides of piston 22, the latter has no effect in opposing the action of piston 26 whereby the latter is depressed until it is in contact with disc 37 and opposed by spring 39. This spring is selected to be of a definite strength to determine at what hydraulic pressure power is directed to the booster. While piston 26 is pressed against disc 37 passage or bore 36 is closed so that groove 40 is shut off from the source of low pressure. Further depression of the foot pedal and consequent increase in the hydraulic pressure produced by master cylinder 1 causes spring 39 to yield and disc 37 to break away from groove 40, as shown in Fig. 2, so that air pressure from 43 is admitted to groove 40 and from there through line 44 to chamber 45. Valve 49 is shown seated and therefore does not let any air through. However, valve 48 is open and air is able to pass via slots 59 and passage 46 into power chamber 57 to act against diaphragm 7 and to push it and piston rod 9, as well as pistons 10 and 11 towards the right to decrease the volume in chamber 16. The differences in pressure in chambers 15 and 16 caused by this movement closes valves 18 and 19, whereby fluid from the primary circuit is forced into chamber 15 to help to push piston 10 towards the right. Thus the force with which piston 11 displaces the hydraulic fluid in chamber 16 is the sum of the pressure exerted by diaphragm 7 and piston plates 8 and the hydraulic pressure in chamber 15, and is consequently greater than the hydraulic force of the primary circuit.

So long as the operator continues to depress the brake pedal, the piston 10 will move to the right as viewed in Figure 4 (up to the point at which a reversal of the operation takes place as will be described), and fluid displaced from the master cylinder flows into the chamber 15 to fill the increasing capacity of such chamber and to continue to exert pressure against the piston 10. In order that the boosted pressure is a predetermined multiple of the primary pressure produced by the master cylinder, pistons 22 and 26 of the modulating valve as well as lever 25 are proportioned to effect the desired ratio. Thus the ratio is greater if the diameter of piston 26 is increased or that of piston 22 decreased, or if the fulcrum of lever 25 is positioned nearer to piston 22. If the increased pressure in chamber 28 counterbalances the action of the lower pressure in chamber 30 acting on pistons 26 and 22, spring 39 closes disc 37 to cut off the supply of air to power chamber 57. Chamber 56 is in communication with the source of low pressure 35 through bore 53. Assuming now that the fluid required to fully actuate slave cylinders or wheel cylinders 2 is of such volume that the latter are not fully actuated by one stroke of piston 11, the movement of the booster pistons including diaphragm 7 is reversed by the re-positioning of reversing valves 48 and 49. This is effected by lever 52' whose forked lower end is urged to the right by piston rod 9 so that valve 49 is pushed to the left, seating valve 48 to close off chamber 57 from the fluid pressure and to open it up to the low pressure through bore 53 at the left. The movement of valves 48 and 49 is marked by a rapid snapping action from one position to the other. This is by virtue of the fluid pressure in chamber 45 tending to keep the seated valve closed. Levers 52 and 52' are somewhat resilient whereby movement of piston rod 9 to the right does not cause valve 49 to unseat immediately but instead flexes lever 52' slightly with an increasing force so that as soon as the seat is broken the valve snaps into the new position closing the opposite valve 48 whose movement to seat itself on insert 50 is accelerated by the fluid pressure in chamber 45. Thus fluid pressure is admitted to chamber 56 while 57 is open to low pressure, consequently diaphragm 7, piston plates 8 and pistons 10 and 11 move in unison towards the left. For an instant during the reversal of the booster pistons all check valves are seated but as soon as the pistons move to the left valves 18 and 19 open.

At the end of the stroke piston rod 9 hits the lower forked end of lever 54 which in turn snaps valves 48 and 49 over to the right to cause reversal of the pistons in a manner similar to that described before. Thus reciprocation of the booster elements is afforded, taking place until a sufficient amount of hydraulic fluid is pumped to actuators 2 and the secondary or boosted pressure has attained a pre-determined multiple of the primary pressure. When this pressure is reached piston 22 counterbalances piston 26 whereby spring 39 seats disc 37 to close off the supply of fluid pressure so that movement of pistons 10 and 11 is stopped. Assuming that the operator holds the brake pedal depressed to the position corresponding to the point at which the pumping action stopped, the generated braking pressure will be maintained.

Supposing now that the operator releases the brake pedal so that the pressure drops in the primary circuit, piston 22 overpowers piston 26 and raises it to first permit the disk 37 to seat and then move further upwardly until the upper extremity of piston rod 31 unseats check valve 32 allowing the secondary hydraulic pressure to relieve itself from passage 27, the fluid thus released flowing from the passage 27 into chamber 30 and to master cylinder 1 which returns to its "off" position. At the same time, since piston 26 is in a raised position and passage 36 open to groove 40, the pressure in chamber 45 is relieved and the booster pistons remain in whichever position they are in.

It will thus be noted that the relief of the boosted pressure is practically instantaneous due to the action of the modulating valve and the incorporation of valve 32.

Describing now the operation of the modified construction illustrated in Fig. 3, and assuming that the operator actuates master cylinder 1 to produce a primary pressure in line 3, the pressure is readily transmitted through check valves 17, 18, 19, and 20 to wheel cylinders 2 which apply the brakes. The primary hydraulic pressure also acts on piston 76 urging to compress spring 80 which has a similar function as spring 39 in Fig. 1. When the primary pressure produced by the master cylinder is sufficient to compress spring 80 valve plunger 76 moves to the left until groove 75 is in communication with chamber 83 and via 34 with bores 53 which become subject to lower pressure from the source of vacuum 73. Assuming valves 48 and 49 to be in a position as shown on the drawings, the air in chamber 56 becomes evacuated, while atmospheric pressure is admitted through line 81, valve 48, and passage 46 to chamber 57 causing the latter to move in a manner similar to that described in Fig. 1. With the valve piston 76 moved to the left to energize the motor as stated, the motor will continue to operate until movement of the brake pedal is arrested. When this occurs, assuming that the motor piston is moving toward the right in Figure 3, no more fluid will be displaced from the master cylinder but the motor piston will move toward the right a short distance, increasing the capacity of the chamber 15 and drawing fluid from the chamber 77 thereinto. Very slight movement of the motor after movement of the brake pedal is arrested will result in moving the valve piston 76 to a cut-off position and the motor will stop functioning. If the motor piston is moving in the opposite direction, fluid will be withdrawn from the chamber 77 through lines 3, past check valve 18 into the chamber 16, and motor operation will be arrested. While modulating valve 76 is exaggerated in proportion for the purpose of illustration, it is apparent that the movement necessary for proper function is very small, and in order to prevent excessive movement cover 61 in actual construction is made sufficiently shallow to serve as a stop for diaphragm plate 84.

The primary hydraulic pressure also acts against piston 68 and ball 64 from chamber 71. The secondary or boosted pressure acts on the opposite side of ball 64 opposing piston 68 through the intermediary of lever 65. So long as the boosted hydraulic pressure does not exceed the pre-determined multiple, ball 64 remains seated, but any tendency of the boosted pressure to exceed such multiple will slightly unseat the ball 64, thus readjusting the primary and secondary pressures to the desired ratio. This ratio will be determined by the effective lever arms of the lever 65 and by the ratio of the area of the piston 68 to the effective area of the ball 64, that is, the area corresponding to the cross-sectional area of the secondary pressure port to which the ball 64 is exposed when seated. Any unseating of the ball 64 to readjust the pressure ratio will result in a negligible flow of fluid which will return to the master cylinder, or to the chamber 15 if the piston 10 should be continuing to move. As soon as the operator releases the foot pedal and the primary pressure drops the boosted pressure acting on valve 64 overpowers piston 68 and unseats ball 64 so that the fluid from the secondary circuit may return to master cylinder 1 through hole 66 or groove 72.

As the primary pressure drops the suction in chamber 83 causes diaphragm 60 to push plunger 76 into cylinder 77 shutting off the source of vacuum from chamber 83. However, power piston 7, 8 continues to move until the pressures in 56 and 57 are equalized, though not having any effect on the brakes or hampering their release.

While the novel booster is illustrated in conjunction with a conventional hydraulic braking system having a master cylinder or pressure producing means, and a plurality of wheel cylinders or pressure receiving means or actuators, I wish to make it understood that the booster disclosed may be used in many other hydraulic systems without departing from the scope of the invention. Thus pressure producing means may designate a hydraulic master cylinder for a braking system or it may indicate a primary source of pressure for a function other than for applying hydraulic brakes. Pressure receiving means may indicate brake wheel cylinders or hydraulic means for actuating devices other than brakes.

As a power source for brake boosters vacuum is most commonly used because it is readily available from the intake manifold. However, the booster shown in Fig. 1 is neither dependent on this type of power alone, as 43 may represent a source of higher air pressure and 35 may be open to the atmosphere, nor does the fluid medium have to be air; instead it may represent a hydraulic pump and 35 its reservoir tank or sump.

I claim:

1. A hydraulic booster comprising a low pressure line, means for generating pressure therein, a high pressure line, a device to be operated by pressure therein, a pumping unit having a pair of chambers and a pair of devices connected together to expand one chamber while contracting the other, said chambers communicating with said high and low pressure lines, power means connected to said devices for operating them, check valves enabling fluid to flow from said low pressure lines into said chambers whereby pressure in said low pressure line assists said power means in operating said pumping unit, means for energizing said power means to generate pressure in said high pressure line when pressure in said low pressure line increases, means for reversing the action of said motor mechanism when one of said chambers has been expanded and the other contracted to a predetermined extent, and means subject to operation by pressure in said high pressure line when such pressure exceeds a predetermined multiple of the pressure in said low pressure line to relieve pressure from said high pressure line into said low pressure line.

2. A hydraulic booster comprising expansible hydraulic pressure chambers, a source of hydraulic pressure, low pressure connections from said source to said chambers, a device to be actuated by relatively high pressure, high pressure connections between said device and said chambers, check valves in said connections to permit the flow of hydraulic fluid from said low pressure connections into said chambers and from said chambers to said high pressure connections, a motor mechanism to expand and contract said chambers, means responsive to the generation of pressures in said source to energize said motor mechanism to produce pressure in said high pressure connections, a relief valve controlling communication between said high pressure connections and said low pressure connections, a control piston responsive to pressures in said low pressure line to tend to close said relief valve, and a control piston having one end exposed to pressure in said high pressure connections to tend to open said relief valve, the latter control piston having its other end exposed to hydraulic pressure in said low pressure connections.

3. A hydraulic booster system comprising a primary pressure line and a secondary pressure line, a booster intermediate said lines comprising a pair of chambers, a double acting piston having its ends operable in the respective chambers, one of said chambers being exposed to pressure in said primary pressure line and the other chamber being exposed to the pressure in said secondary pressure line, a motor mechanism to actuate said double acting piston to expand the first mentioned chamber and contract the second mentioned chamber, means for reversing said motor mechanism after said piston has moved a predetermined distance, means for reversing the connections of said chambers to said lines when movement of said piston is reversed, and means for energizing said motor mechanism to generate pressure in said secondary pressure line upon a predetermined increase in pressure in said primary pressure line.

4. A hydraulic booster system comprising a primary pressure line and a secondary pressure line, a booster intermediate said lines comprising a pair of coaxial cylinders, a pair of coaxial opposed pistons slidable in said cylinders, a motor mechanism to actuate said pistons, said lines being connected to both of said pressure chambers and being provided with check valves arranged to allow the free flow of fluid from said primary line to said secondary line but to check the flow of fluid from said secondary line to said primary line, means for reversing the direction of motion of said motor mechanism when said pistons have moved in either direction to a predetermined extent, and means responsive to pressures in said primary pressure line and said secondary pressure line to establish communication between said lines when the pressure in said secondary line exceeds a predetermined multiple of the pressure in said primary line.

5. Apparatus constructed in accordance with claim 4 provided with a power-control device for said motor mechanism, and means connected to said device and responsive to pressure in said primary line and to the degree of power generated by said motor mechanism for modulating the power of said motor mechanism.

6. Apparatus constructed in accordance with claim 4 provided with a power-control device for said motor mechanism, means responsive to pressure in said primary line and connected to said device to tend to increase the power of said motor mechanism, and means responsive to pressure in said secondary line and connected to said device to tend to decrease the power of said motor mechanism.

7. In a hydraulic braking system having a master cylinder operated by the operator and wheel cylinders to apply the brakes, a booster having hydraulic pressure chambers, fluid transmitting lines from the master cylinder to said pressure chambers and from said pressure chambers to the wheel cylinders, check valves in said pressure transmitting lines arranged to permit the flow of hydraulic fluid from the master cylinder to said pressure chambers and from said chambers to said wheel cylinders, pistons arranged in the respective pressure chambers and movable in unison so that one piston expands its chamber while the other piston contracts its chamber, a motor mechanism to actuate said pistons, a power-control device for said motor mechanism, means for operating said device to energize said motor mechanism upon the generation of pressure in said master cylinder, means for reversing the direction of movement of said motor mechanism when said pistons have moved a predetermined distance in either direction, and means providing for the passage of fluid from said wheel cylinders to said master cylinder when the pressure in the latter is reduced.

8. A hydraulic booster comprising fluid pressure producing means, a device operable by fluid pressure, a fluid pressure transmitting means connected to said pressure producing means and to said device, a booster comprising hydraulic cylinders interposed in said pressure transmitting means, pistons slidable in the respective cylinders, power means to reciprocate said pistons in response to hydraulic pressure produced by said pressure producing means, check valves in said pressure transmitting means to prevent the flow of fluid from said cylinders to said pressure producing means and from said device to said cylinders, and means responsive to the hydraulic pressure in said device and to the hydraulic pressure in said pressure producing means to afford communication between said device and said pressure producing means when the pressure in the latter is relieved.

9. A hydraulic booster system comprising fluid pressure producing means, a device operable by fluid pressure, a hydraulic pressure booster having hydraulic cylinders and pistons slidable in the respective cylinders, fluid pressure transmitting means connecting said cylinders to said pressure producing means and to said device, check valves interposed in said pressure transmitting means to prevent the flow of fluid from said device to said cylinders and from the latter to said pressure producing means, an expansible motor mechanism to actuate said pistons, a source of fluid pressure to operate said motor mechanism, means for modulating the application of fluid pressure from said source to said motor mechanism to generate power proportionate to the pressure produced by said pressure producing means, reversing valve means to control the direction of motion of said motor mechanism, means operatively engaged with said reversing valve means and arranged to be actuated upon a predetermined movement of said pistons in either direction to reverse the operation of said motor mechanism, and means for returning fluid from said device to said pressure producing means when pressure in the latter is reduced.

10. Apparatus constructed in accordance with claim 9 wherein said reversing valve means are constructed and arranged to resist movement by said reversing means to give them a snapping action.

11. Apparatus constructed in accordance with claim 9 wherein said reversing valve means comprises a pair of slidable valves each having a valve head urged by the pressure of said source, when seated, to remain seated.

WILLIAM STELZER.